(12) United States Patent
Oren et al.

(10) Patent No.: US 11,802,829 B2
(45) Date of Patent: Oct. 31, 2023

(54) METHOD AND SYSTEM FOR BROADBAND PHOTOREFLECTANCE SPECTROSCOPY

(71) Applicant: NOVA LTD., Rehovot (IL)

(72) Inventors: Yonatan Oren, Kiryat Ono (IL); Gilad Barak, Rehovot (IL)

(73) Assignee: NOVA LTD., Rehovot (IL)

( * ) Notice: Subject to any disclaimer, the term of this patent is extended or adjusted under 35 U.S.C. 154(b) by 0 days.

(21) Appl. No.: 17/757,224

(22) PCT Filed: Dec. 8, 2020

(86) PCT No.: PCT/IL2020/051265
§ 371 (c)(1),
(2) Date: Jun. 11, 2022

(87) PCT Pub. No.: WO2021/117035
PCT Pub. Date: Jun. 17, 2021

(65) Prior Publication Data
US 2023/0003637 A1    Jan. 5, 2023

Related U.S. Application Data

(60) Provisional application No. 62/946,495, filed on Dec. 11, 2019.

(51) Int. Cl.
*G01N 21/25* (2006.01)
*G01N 21/17* (2006.01)

(52) U.S. Cl.
CPC ......... *G01N 21/1717* (2013.01); *G01N 21/25* (2013.01); *G01N 2021/1725* (2013.01)

(58) Field of Classification Search
CPC ............... G01N 21/1717; G01N 21/25; G01N 2021/1725; G01N 21/636; G01N 2021/4735; G01N 21/47; G01Q 60/22; G01J 2001/4242; G01J 3/4338
USPC .................................. 356/432, 326, 445–448
See application file for complete search history.

(56) References Cited

U.S. PATENT DOCUMENTS

| | | | | | |
|---|---|---|---|---|---|
| 4,540,285 | A | * | 9/1985 | Amer ................... | G01N 21/171 356/432 |
| 4,750,822 | A | * | 6/1988 | Rosencwaig .......... | G01N 21/17 356/432 |
| 5,270,797 | A | * | 12/1993 | Pollak ................ | G01N 21/1717 356/417 |
| 6,452,685 | B2 | * | 9/2002 | Opsal ................. | G01N 21/1717 356/601 |

(Continued)

*Primary Examiner* — Isiaka O Akanbi
(74) *Attorney, Agent, or Firm* — Reches Patents

(57) ABSTRACT

Photoreflectance (PR) spectroscopy system and method for accumulating separately a "pump on" light beam and a "pump off" light beam reflecting off a sample. The system comprises: (a) a probe source for producing a probe beam, the probe beam is used for measuring spectral reflectivity of a sample, (b) a pump source for producing a pump beam, (c) at least one spectrometer, (d) a first modulation device to allow the pump beam to alternatingly modulate the spectral reflectivity of the sample, so that, a light beam reflecting from the sample is alternatingly a "pump on" light beam and a "pump off light beam, (e) a second modulation device in a path of the light beam reflecting off the sample to alternatingly direct the "pump on" light beam and the "pump off light beam to the at least one spectrometer, and (f) a computer.

10 Claims, 6 Drawing Sheets

(56) References Cited

U.S. PATENT DOCUMENTS

| | | | |
|---|---|---|---|
| 7,075,058 B2* | 7/2006 | Chinn | G01N 25/72 |
| | | | 250/234 |
| 7,847,937 B1* | 12/2010 | Bevis | G01N 21/1717 |
| | | | 356/225 |
| 9,640,449 B2* | 5/2017 | Goodwin | H01L 22/12 |
| 2002/0071122 A1 | 6/2002 | Kulp et al. | |
| 2005/0213192 A1* | 9/2005 | Murtagh | G01J 3/433 |
| | | | 359/298 |
| 2008/0225267 A1 | 9/2008 | Murtagh et al. | |
| 2015/0338212 A1 | 11/2015 | Moreau et al. | |
| 2019/0056313 A1* | 2/2019 | Miller | G01J 3/4338 |
| 2019/0250038 A1* | 8/2019 | Jeys | G01J 3/108 |

* cited by examiner

512 — Using a second modulation device in the collection channel to direct a "pump on" light beam and a "pump off" light beam to a single spectrometer 116, 316 when using either the system of Fig. 1 or the system of Fig. 3. Alternatively, when using the system of Fig. 4, directing a "pump on" light beam to one spectrometer 426B and a "pump off" light beam to another spectrometer 426A

514 — Converting the "pump on" light beam and the "pump off" light beam into a "pump on" signal and a "pump off signal and transferring the "pump on" signal and the "pump off signal to a computer

516 — Subtracting the "pump on" signal produced via the "pump on" output beam from the "pump off" signal produced via the non-modulated output beam to get the PR signal ΔR

Fig. 5 (continue)

METHOD AND SYSTEM FOR BROADBAND PHOTOREFLECTANCE SPECTROSCOPY

FIELD OF THE INVENTION

The present invention relates to semiconductor measurement techniques. More specifically, the present invention relates to semiconductor metrology techniques for measurement of device critical dimensions by optical means.

BACKGROUND OF THE INVENTION

Semiconductor manufacturing is continuously evolving towards smaller device dimensions in an effort to improve performance, power efficiency and cost. Maintaining this trend requires ever tighter and more efficient process control—and thus also metrology—both in terms of critical dimensions and material properties. In this context, optical metrology methods are distinguished for their non-destructive, non-contact mechanism combined with high throughput and small measurement spot. Specifically, optical spectroscopic methods such as Spectral Reflectometry (SR) and Spectral Ellipsometry (SE) are commonly used for dimensional metrology (OCD) and process control. By inspecting light reflected from a sample, information about the optical properties and thickness of thin films can be deduced, as well as dimensional parameters of complex patterned structures. However, these methods often have very low sensitivity to intrinsic material properties such as electrical (e.g. carrier lifetime, mobility) and mechanical (e.g. strain/stress) parameters. Other methods for measuring such properties often suffer from various shortcomings—such as being destructive, requiring contact with the sample, having very long measurement time or excessively large measurement spot.

Thus, it is an aim of the present invention to provide an apparatus and a method for measuring the light-induced change in optical properties of a sample. A system and a method that overcome the above-mentioned drawbacks of systems and methods available nowadays.

SUMMARY OF THE INVENTION

Modulation Spectroscopy (MS) refers to a family of techniques where the sample is perturbed in some way from its nominal state, and the change in spectrum (rather than the spectrum itself) as a response to that perturbation is measured. Examples of this are Thermo Reflectance, where the difference in reflectivity due to temperature change is measured, Electro/Magneto Reflectance where an electrostatic/magnetostatic, respectively, field is applied or Photo Reflectance, where an optical field is used.

As the spectral reflectivity of a material is closely related to electronic properties such as band structure, density of states, free carries etc., modulation spectroscopy (MS) is uniquely sensitive to these properties more than any other optical spectroscopy method. This can be of high value when electrical testing of semiconductor devices needs to be done at the early stages of their fabrication process, where conventional E-testing is impossible.

The present invention is of an apparatus and method for broadband Photoreflectance (PR) spectroscopy, i.e., for measuring the light-induced change in optical properties of a sample. The PR apparatus, in accordance with some embodiments of the present invention, uses two-beams: a first probe beam used for measuring the spectral reflectivity of a sample, and a second pump beam used for modulating the reflectivity. The PR measured value is $\Delta R/R$, where $R(\omega)+\Delta R(\omega)$ and $R(\omega)$ are the spectral reflectivity with and without the pump beam, respectively.

In most circumstances the magnitude of $\Delta R/R$ is very small, on the order of $10^{-5}$–$10^{-4}$. Measuring this small change in reflectivity requires signal-to-noise ratios (SNR) of $\sim 10^6$ which is challenging due to the noise and spurious signal sources present in standard spectroscopic systems.

The eventual performance and advantage of the PR apparatus and method of the present invention is described below.

In accordance with the present invention, the main noise factors in PR measurements are as follows:

Shot noise: The shot noise in the detection of N photons (or photoelectrons) is $\sqrt{N}$. In PR, the signal of interest $\Delta R$ is the result of subtracting two much stronger signals R and R+$\Delta R$. The noise in each of these signals is uncorrelated, and so not subtracted. So, if N photoelectrons are detected at reflectance R, the SNR becomes $$SNR \approx \sqrt{\frac{N}{2}} \frac{\Delta R}{R}.$$

For example, to detect a PR signal $$\frac{\Delta R}{R} \approx 10^{-5}$$

with SNR=10, a total of $2 \cdot 10^{12}$ photoelectrons need to be collected (per pixel), which amount to a few μJ for visible light.

"1/f" noise coming from the source, detector and electronics. This type of noise is difficult to overcome since, as its name suggests, it scales inversely with the frequency or linearly with acquisition time—meaning that increasing measurement time does not help to average it out (or in other words, it contains long-term correlations).

The common mitigation to this, called Lock-in Detection (LID), is to modulate the pump beam at a sufficiently high frequency (typically ~hundreds Hz) and pass the probe detector signal through a lock-in amplifier (LIA) locked to the pump modulation frequency—thus isolating the frequencies close to the modulation frequency and rejecting the rest.

This works very well, but the complex electronics make it practical only for a single channel measurement system. Acquiring a full spectrum in this way requires measuring each spectral component of the probe beam sequentially—usually by means of a scanning monochromator.

Such a procedure drastically increases the measurement time compared with the multichannel approach used in standard spectroscopic methods, e.g. by dispersing the collected probe beam onto a CCD or other multichannel sensor and measuring all wavelengths in parallel.

Quantization and Read-out noise are uncorrelated noise sources incurred per acquisition of the CCD. If the modulation frequency is increased to better deal with 1/f noise, the number of read-outs is proportionally increased, ultimately making these noises dominate over the shot noise.

As explained, to overcome 1/f noise, PR measurements require the use of a modulated pump with lock-in detection. Pump modulation can be achieved in one of several ways: placing a modulation device (such as a mechanical chopper wheel, electro-optic or acousto-optic modulator) in the pump laser beam path, or directly modulating the pump laser power.

If the probe is monochromatic (laser PR), this is relatively straightforward to do with available fast detectors and LIA electronics. However, photoreflectance (PR) spectroscopy is a different matter—here the probe source is broadband, and the reflected light needs to be sampled at many different wavelengths to build up a PR spectrum. Broadly speaking there are two approaches to doing this:

Using traditional Lock-In Detection (LID) as described above, the reflected probe beam must be passed through a monochromator and each wavelength measured sequentially. This means repeating the same measurement hundreds of times, making the throughput very low and ill-suited to industrial applications Using a spectrometer which disperses the probe beam onto a multi-channel detector (e.g. CCD) and reads all wavelengths simultaneously, as is commonly done in SE and SR. However, for photoreflectance (PR) spectroscopy the small signal still requires some form of LID to overcome noise, and this is not easily done on a pixel-by-pixel basis. The way it can be done is by using high-end CCDs and electronics which can read spectra at high frame rates (synchronized to the pump modulation) and low noise. The data is then processed on a computer to mathematically achieve the same effect as a LIA, essentially imposing a narrow bandpass filter around the pump modulation frequency in order to cancel noise at all other frequencies. If the frames are fully aligned to the pump cycles, this essentially amounts to accumulating all the "pump-off" frames and subtracting the result from the accumulated "pump-on" frames to get the PR signal $\delta R(\lambda)$. However, the problem with this approach is that it requires sophisticated and expensive sensors and electronics, most likely custom made. Thus, in accordance with some embodiments of the present invention, there is provided an improved apparatus and a method for measuring the light-induced change in optical properties of a sample. More specifically, an apparatus and method which overcome the above-described limitations of apparatuses and methods available nowadays.

Thus, in accordance with some embodiments of the present invention, there is provided a photoreflectance (PR) spectroscopy apparatus for accumulating separately a "pump on" light beam and a "pump off" light beam reflecting off a sample. The photoreflectance (PR) spectroscopy apparatus comprises:

a probe source for producing a probe beam, said probe beam is used for measuring spectral reflectivity of a sample;

a pump source for producing a pump beam;

at least one spectrometer;

a first modulation device to allow said pump beam to alternatingly modulate the spectral reflectivity of the sample, so that, a light beam reflecting from said sample is alternatingly a "pump on" light beam and a "pump off" light beam; and a second modulation device in a path of said light beam reflecting off the sample to alternatingly direct said "pump on" light beam and said "pump off" light beam to the at least one spectrometer;

wherein in case said photoreflectance (PR) spectroscopy apparatus comprises a single spectrometer, said single spectrometer projects said "pump on" light beam to at least one row on a CCD and said "pump off" light beam to another row(s) on the CCD, so that "pump on" signals and "pump off" signals are accumulated separately, and wherein in case said photoreflectance (PR) spectroscopy apparatus comprises multiple spectrometers, said second modulation device directs said "pump on" light beam to one spectrometer and said "pump off" light beam to another spectrometer so that "pump on" signals and "pump off" signals are accumulated separately.

Furthermore, in accordance with some embodiments of the present invention, the pump beam is attenuated via electronic, optical or electro-optical means.

Furthermore, in accordance with some embodiments of the present invention, the first modulation device is either in a path of the pump beam or directly modulating said pump source power.

Furthermore, in accordance with some embodiments of the present invention, the first modulation device and/or said second modulation device are selected from a mechanical chopper wheel, electro-optic modulator or acousto-optic modulator.

Furthermore, in accordance with some embodiments of the present invention, each of the first modulation device and the second modulation device is either a synchronized chopper wheel controller or a deflection device.

Furthermore, in accordance with some embodiments of the present invention, in case said second modulation device is a synchronized chopper wheel controller, the photoreflectance (PR) spectroscopy apparatus further comprises a beam splitter for splitting the light beam reflecting from the sample into a "pump on light beam and a "pump off" light beam.

Furthermore, in accordance with some embodiments of the present invention, photoreflectance (PR) spectroscopy apparatus further comprising an optical element for directing the "pump on" light beam to the second modulation device.

Furthermore, in accordance with some embodiments of the present invention, the CCD of said single spectrometer is either a multiple array sensor or multi separate linear arrays sensor.

Furthermore, in accordance with some embodiments of the present invention, the multiple array sensor is a 2D sensor array.

Furthermore, in accordance with some embodiments of the present invention, a frame rate of said CCD is constrained by a full-well capacity of said multiple array sensor or said multi separate linear arrays sensor.

Furthermore, in accordance with some embodiments of the present invention, there is provided a photoreflectance (PR) spectroscopy system for measuring and calculating light-induced change in optical properties of a sample.

The photoreflectance (PR) spectroscopy system comprises the above-described photoreflectance (PR) spectroscopy apparatus and a computer, wherein the photoreflectance (PR) spectroscopy apparatus converting said "pump on" light beam and said "pump off" light beam to a "pump on" signal and a "pump off" signal and transferring said "pump on" signal and said "pump off" signal to a computer, and said computer subtract the "pump on" signal corresponding to a spectrum (R) from the "pump off" signal corresponding spectrum (R+ΔR) to get a PR signal ΔR.

Furthermore, in accordance with some embodiments of the present invention, there is provided a photoreflectance (PR) spectroscopy method for measuring and calculating light-induced change in optical properties of a sample. The method comprising:

(a) providing the above-described photoreflectance (PR) spectroscopy system;

(b) focusing a probe beam and a pump beam onto a single spot on a sample;

(c) using a first modulation device to alternatingly direct the pump beam to said single spot on the sample;

(d) continuously hitting said single spot via the probe beam;

(e) alternatingly hitting said single spot by the pump beam to alternatingly modulate the reflectivity of said single spot on the sample, so that, a light beam reflecting off said sample is comprised of a "pump on" light beam and a "pump off" light beam;

(f) using a second modulation device to direct the "pump on" light beam and the "pump off" light beam either to a single spectrometer or to multiple spectrometers;

(g) converting said "pump on" light beam and said "pump off" light beam into a "pump on" signal and a "pump off" signal and transferring said "pump on" signal and said "pump off" signal to a computer; and (h) subtracting the "pump on" signal corresponding to a spectrum (R) from the "pump off" signal corresponding spectrum (R+ΔR) to get a PR signal ΔR.

Furthermore, in accordance with some embodiments of the present invention, the method further comprising projecting the "pump on" light beam to at least one row on a CCD and the "pump off" light beam to another row(s) on said CCD. in case of a single spectrometer.

Furthermore, in accordance with some embodiments of the present invention, the method further comprising projecting the "pump on" light beam to one spectrometer and the "pump off" light beam to another spectrometer in case of multiple spectrometers,

DETAILED DESCRIPTION OF THE FIGURES

The present invention provides a new apparatus and method for broadband spectroscopic photoreflectance using high-frequency Lock-in detection with low-frequency detector readout.

Unlike the prior approach described above which requires sophisticated and expensive sensors and electronics, most likely custom made, the apparatus and method of the present invention allows PR measurements to be made with common off-the-shelf hardware.

Figure 1:
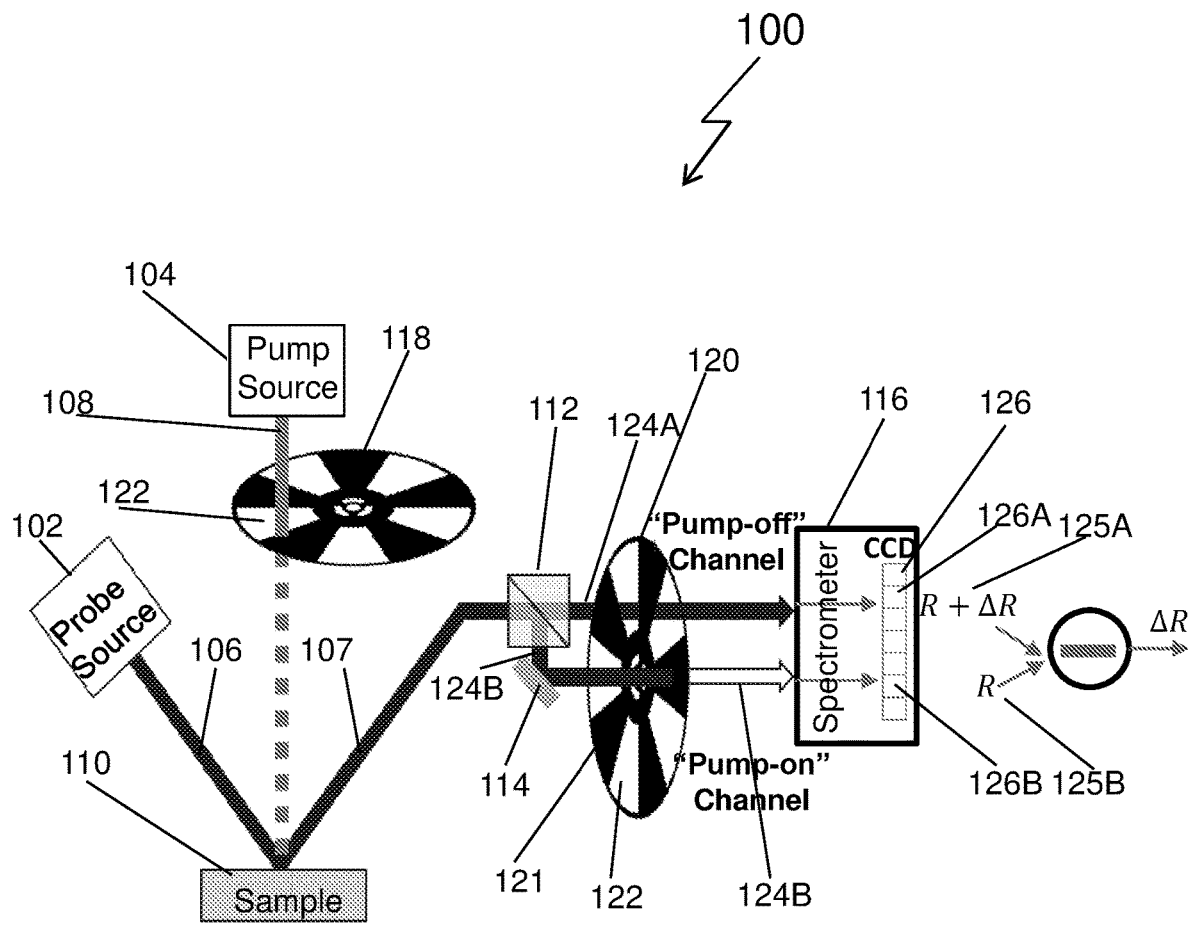
FIG. 1 illustrates a photoreflectance (PR) spectroscopy apparatus 100 for measuring the light-induced change in optical properties of a sample in accordance with some embodiments of the present invention.

FIG. 1 illustrates a photoreflectance (PR) spectroscopy apparatus 100 for measuring the light-induced change in optical properties of a sample in accordance with some embodiments of the present invention.

Photoreflectance (PR) spectroscopy apparatus 100 comprises a probe source 102 and a pump source 104 for producing a probe beam 106 and a pump beam 108 respectively. The probe beam 106 is used to measure the spectral reflectivity of a sample 110, while the pump beam 108 is used to modulate the reflectivity of the sample 110. The pump beam 108 may be attenuated electronically or via appropriate attenuation optical filters, e.g., mechanically shiftable into/out optical path of pump beam and/or based on electro-optical means, etc.

The Photoreflectance (PR) spectroscopy apparatus 100 further comprises two modulation devices, a first modulation device in the path of the pump beam 108 (or directly modulating the pump power) and a second modulation device in the path of the probe beam 107 reflecting from the sample 110, a beam splitter 112, an optical element, such as a mirror 114, for directing the light beam 124 to a desired direction, and a spectrometer 116 comprised of a Charge Coupled Device (CCD) 126 which may include a 2D spectral resolving sensor array and a readout circuitry.

In accordance with some embodiments of the present invention, when light enters the spectrometer 116, it is projected by the spectrometer optics onto the spectral resolving sensor array, e.g., onto CCD 126, which converts the incoming light spectrum into an electronic signal.

In accordance with some embodiments of the present invention, the CCD 126 may be either a single multi-dimensional sensor array or multiple one dimensional sensor arrays.

In accordance with some embodiments of the present invention, the first and second modulation devices may be selected from mechanical chopper wheels, electro-optic modulators, acousto-optic modulators and the like. Here, as seen in the figure, the first and second modulation devices are a first synchronized chopper wheel controller 118 and a second synchronized chopper wheel controller 120.

The first synchronized chopper wheel controller 118 alternatingly directs (transfers) the pump beam 108 to the sample 110, e.g., the pump beam 108 is alternatingly transmitted through unblocked channels, such as channel 122, and thus, alternatingly reaches the sample 110.

Thus, in accordance with some embodiments of the present invention, there are two modes in measurements, one while the pump beam 108 is reaching the sample 110 and another while the pump beam 108 is shuttered out.

While the pump beam 108 is reaching the sample 110, the light beam 107 reflecting off the sample 110 is a "pump-on" beam, and when the pump beam 108 is shuttered out, the light beam 107 reflecting off the sample 110 is a "pump-off" beam.

Due to the use of a "pump on" light beam and a "pump off" light beam, there is no need to synchronize the CCD readout to the pump, and multiple modulation cycles can be accumulated without any readout.

The second synchronized chopper wheel controller 120 switching element in the collection channel is used to alternatingly direct the light beam 107, e.g., the "pump on" light beam and the "pump off" light beam, collected from the sample 110 to the spectrometer 116.

In accordance with some embodiments of the present invention, prior to reaching the second synchronized chopper wheel controller 120, the light beam 107 collected from the sample 110 is splitted via a beam splitter, such as a 50:50 beam splitter 112, into a "pump off" output beam 124A and a "pump on" output beam 124B.

As seen in the figure, mirror 114 redirects the "pump on" output beam 124B to the spectrometer 116.

In accordance with some embodiments of the present invention, the spectrometer 116 projects the "pump off" output beam 124A and the "pump on" output beam 124B to different rows on the CCD 126, for instance, row 126A and row 126B.

In accordance with some embodiments of the present invention, since the "pump off" output beam 124A and the "pump on" output beam 124B are projected by the spectrometer optics onto different rows on the CCD 126, the frame rate is not constrained by the modulation frequency, e.g., the frequency at which the "pump on" state changes to a "pump off" state and vice versa. Instead, the frame rate is constrained only by the full-well capacity of the CCD 126, and thus, PR measurements can be made with common off-the-shelf hardware.

Figure 2:
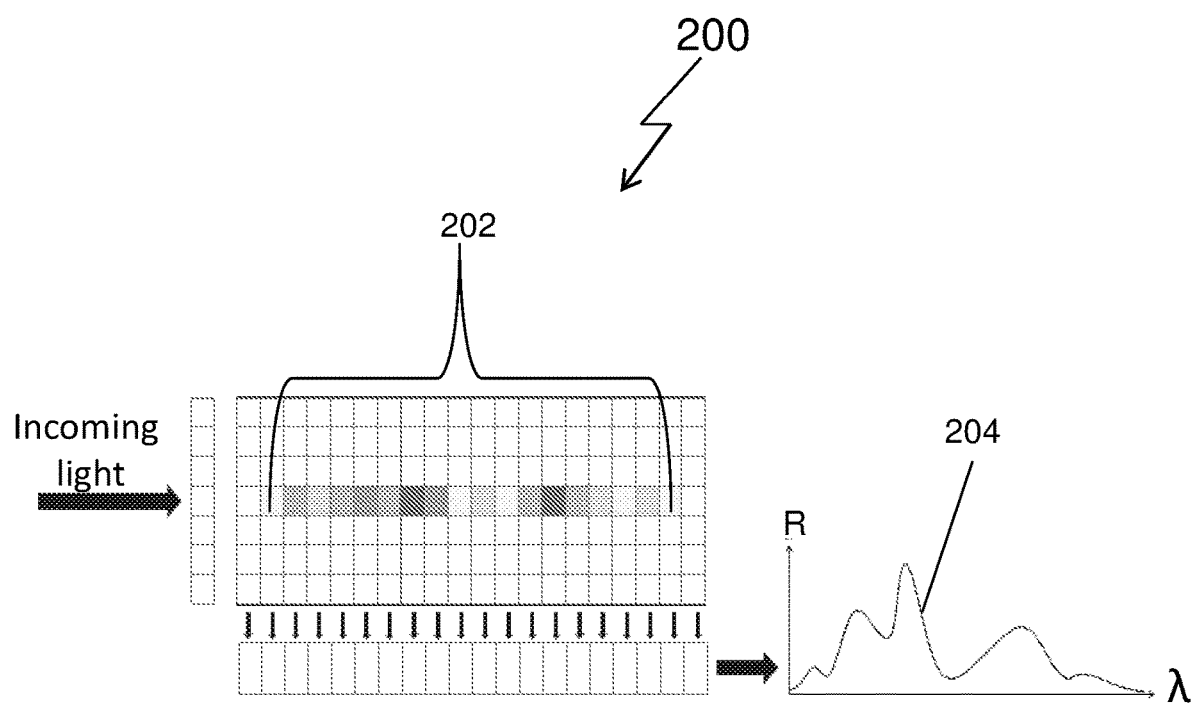
FIG. 2 illustrates an example of a CCD illumination 200 in accordance with some embodiments of the present invention.

FIG. 2 illustrates an example of a CCD illumination 200 in accordance with some embodiments of the present invention.

As seen in the figure, in a normal spectrometry the CCD lines, lines 202, are integrated vertically to yield a single spectrum 204 which is transmitted to a computer.

It should be noted that it is common for spectrometer acquisition electronics to integrate the CCD pixels row-wise into the single accumulated spectrum 204 seen in FIG. 2. However, a multiple-region mode is a common feature in these systems allowing to easily define more than one region over which to perform this integration and readout. Once this is done, the two spectra can be easily subtracted to yield the PR signal, e.g., the spectrum (R) 125B produced via the second modulated output beam 124B is subtracted from the spectrum (R+ΔR) 125A produced via the first modulated output beam 124A to yield ΔR.

It should be noted that although the final signal readout from the CCD 126 is done at low frequencies, any low-frequency noise or drift afflicting the measurement will be removed by this method. More specifically, since switching of the "pump-on" and "pump-off" signals takes place at high frequency, such slow variations will affect both signals identically and will be removed upon subtraction of these signals.

It should be noted that the drawback of this approach is that at any given time 50% of the light is being lost in the blocked channel, such as block channel 121, however when the beam is transmitted through an unblocked channel, such as unblocked channel 122, no losses occur.

To overcome such drawback, e.g., to avoid a loss of 50% of the light, an alternative photoreflectance (PR) spectroscopy apparatus 300 is described below.

Figure 3:
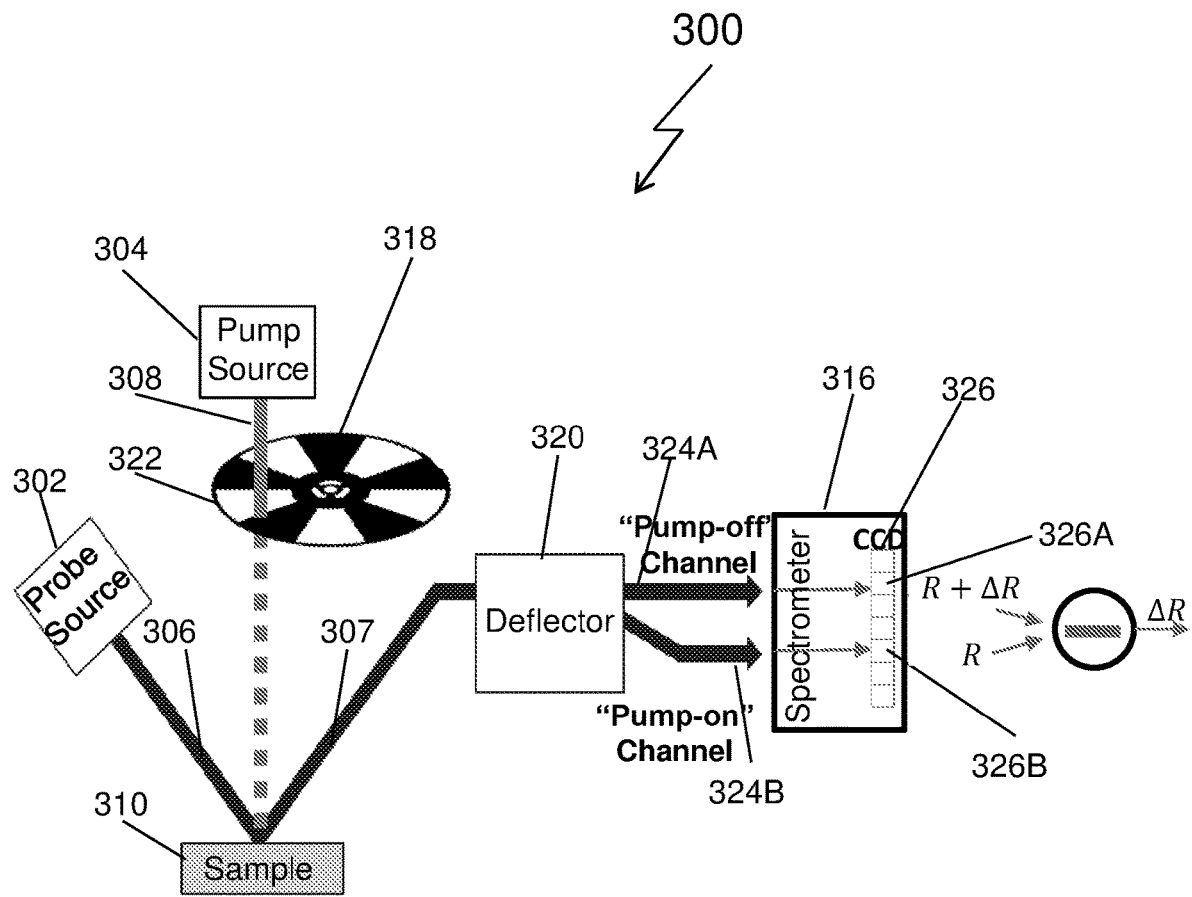
FIG. 3 illustrates an alternative photore:flectance (PR) spectroscopy apparatus 300 for measuring the light-induced change in optical properties of a sample in accordance with some embodiments of the present invention.

FIG. 3 illustrates an alternative photoreflectance (PR) spectroscopy apparatus 300 for measuring the light-induced change in optical properties of a sample in accordance with some embodiments of the present invention.

Seen in the figure, the photoreflectance (PR) spectroscopy apparatus 300 comprises a probe source 302 and a pump source 304 for producing a probe beam 306 and a pump beam 308 respectively. The pump beam 308 may be attenuated electronically or via appropriate attenuation optical filters, e.g., shiftable into/out optical path of pump beam and/or based on electro-optical means.

The Photoreflectance (PR) spectroscopy apparatus 300 further comprises two modulation devices, a first modulation device in the path of the pump beam 308 (or directly modulating the pump power) and a second modulation device in the path of the probe beam 307 reflecting off the sample 310, and a spectrometer 316.

The spectrometer 316 is comprised of a Charge Coupled Device (CCD) 326 which may include a 2D spectral resolving sensor array and a readout circuitry.

Here, the modulation devices may comprise a synchronized chopper wheel controller 318 and a deflection device 320.

The deflection device 320 replaces the second synchronized chopper wheel controller 120, the splitter 112 and the mirror 114 of the photoreflectance (PR) spectroscopy apparatus 100 of FIG. 1 to alternatingly direct the light collected from the sample 310 to spectrometer 316.

In accordance with some embodiments of the present invention, the role of the synchronized chopper wheel controller 318 is identical to that of the first synchronized chopper wheel controller 118 of FIG. 1 as it alternatingly directs the pump beam 308 to the sample 310, e.g., the pump beam 308 is alternatingly transmitted through an unblocked channel, such as channel 322, and thus, alternatingly reaches the sample 310, and thus, while the pump beam 308 reaches the sample 310, the light beam 107 reflecting off the sample 110 is a "pump-on" beam, and while the pump beam 308 is shuttered off, the light beam 107 reflecting off the sample 110 is a "pump-off" beam.

Due to the use of a "pump on" beam and a "pump off" beam, there is no need to synchronize the CCD readout to the pump source 304, and multiple modulation cycles can be accumulated without any readout.

In accordance with some embodiments of the present invention, the deflection device 320 switches elements in the collection channel that alternatingly directs the "pump on" light beam 324B and the "pump off" beam 324A to the spectrometer 316. The deflection device 320 periodically deflects the beam to the required positions on the spectrometer entrance slit, e.g., via an Acousto-Optic deflector (AOD), MEMS mirror and the like.

As seen in the figure, the deflection device 320 directs the "pump off" output beam 324A and the "pump on" output beam 324B to the required positions on the spectrometer entrance slit, and the spectrometer optics project the "pump off" output beam 324A and the "pump on" output beam 324B onto different rows on the CCD 326, for instance, row 326A and row 326B.

Thus, just like in the photoreflectance (PR) spectroscopy apparatus 100 of FIG. 1, in the alternative photoreflectance (PR) spectroscopy apparatus 300, the frame rate is only constrained by the full-well capacity of the CCD, and not by the modulation frequency, allowing PR measurements to be made with common off-the-shelf hardware.

In accordance with some embodiments of the present invention, the spectrum acquisition may be realized in several ways, e.g., as described using a multiple array such as a 2D sensor array, but also using two separate linear sensor arrays. This can be advantageous in terms of high full-well capacity and frame rate which are much easier to achieve in linear sensor arrays compared to 2D sensor arrays.

The 2D sensor array and readout circuitry 326 may comprise multiple single array CCDs or one 2D CCD. Thus, the deflection device 320 alternatingly directs the collected light to multiple CCDs or to the different regions of the one 2D CCD such that the "pump-on" and "pump-off" signals are accumulated separately. This way, there is no need to synchronize the CCD readout to the pump, and multiple modulation cycles can be accumulated without any readout.

Figure 4:
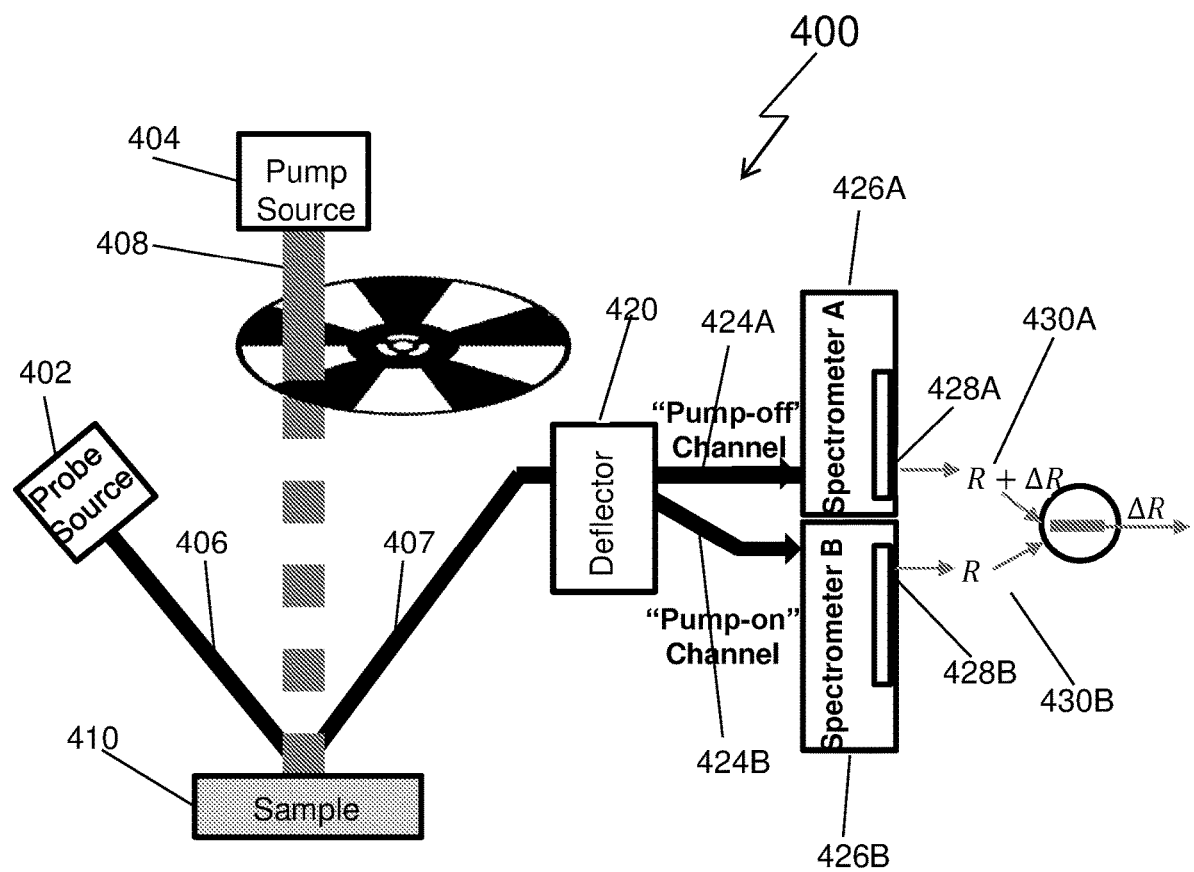
FIG. 4 is a dual Spectrometer photoreflectance (PR) spectroscopy apparatus 400 for measuring the light-induced change in optical properties of a sample in accordance with some embodiments of the present invention.

FIG. 4 is a dual Spectrometer photoreflectance (PR) spectroscopy apparatus 400 for measuring the light-induced change in optical properties of a sample in accordance with some embodiments of the present invention.

The photoreflectance (PR) spectroscopy apparatus 400 is basically the photoreflectance (PR) spectroscopy apparatus 300 of FIG. 3 with an additional spectrometer.

Seen in the figure, the photoreflectance (PR) spectroscopy apparatus 400 comprises a probe source 402 and a pump source 404 for producing a probe beam 406 and a pump beam 408 respectively. The pump beam 408 may be attenuated electronically or via appropriate attenuation optical filters, e.g., shiftable into/out optical path of pump beam and/or based on electro-optical means.

The Photoreflectance (PR) spectroscopy apparatus 400 further comprises two modulation devices, a first modulation device in the path of the pump beam 408 (or directly modulating the pump power) and a second modulation device in the path of the probe beam 407 reflecting off the sample 410, and 2 spectrometers, spectrometer 426A and spectrometer 426B.

The modulation devices may be a synchronized chopper wheel controller 418 to modulate the pump beam 408 and a deflection device 420 to alternatingly direct the light collected from the sample 410, e.g., the "pump off" light beam 424A and the "pump on" light beam 424B to spectrometer 426A and spectrometer 426B respectively (or to the different regions of single 2D CCD).

In accordance with some embodiments of the present invention, each of the synchronized chopper wheel controller 418 and the deflection device 420 may have multiple "intermediate" (or "continuous" transmission changing) states/modes, e.g., fully opaque, partially-opaque/reflective, and totally transparent. In such a case, in addition to a "pump on" beam and a "pump off" beam, an attenuated pump beam mode(s) could be performed within the same measurement session.

Unlike the photoreflectance (PR) spectroscopy apparatuses of FIGS. 1 and 3 which include a single spectrometer, and thus, "pump on" and "pump off" beams are alternatingly directed onto the single spectrometer and projected via the spectrometer optics onto different rows of a single CCD, in here, the "pump off" output beam 424A and the "pump on" output beam 424B are directed onto two different spectrometers, spectrometer 426A and spectrometer 426B. This way, the apparatus is simpler and more convenient for use as there is no need to separate the "pump off" signal and the "pump on" signal from different rows of a single CCD.

The spectra can be retrieved from the two CCDs, e.g., the spectrum (R+ΔR) 430A produced via the "pump off" output beam 424A can be retrieved from CCD 428A, and the spectrum (R) 430B produced via the "pump on" output beam 424B can be retrieved from CCD 428B. Once this is done, the spectrum (R) 430B can be subtracted from the spectrum (R+ΔR) 430A to yield the PR signal, ΔR.

In accordance with some embodiments, a photoreflectance (PR) spectroscopy system may comprise either the photoreflectance (PR) spectroscopy apparatus 100, the photoreflectance (PR) spectroscopy apparatus 300 or the photoreflectance (PR) spectroscopy apparatus 400 and a computer.

The photoreflectance (PR) spectroscopy apparatus 100, 300, 400 converts the "pump on" light beam and the "pump off" light beam to a "pump on" signal and a "pump off" signal and transfers the "pump on" signal and the "pump off" signal to a computer where the "pump on" signal corresponding to a spectrum (R) is subtracted from the "pump off" signal corresponding spectrum (R+ΔR) to get a PR signal ΔR.

Figure 5:
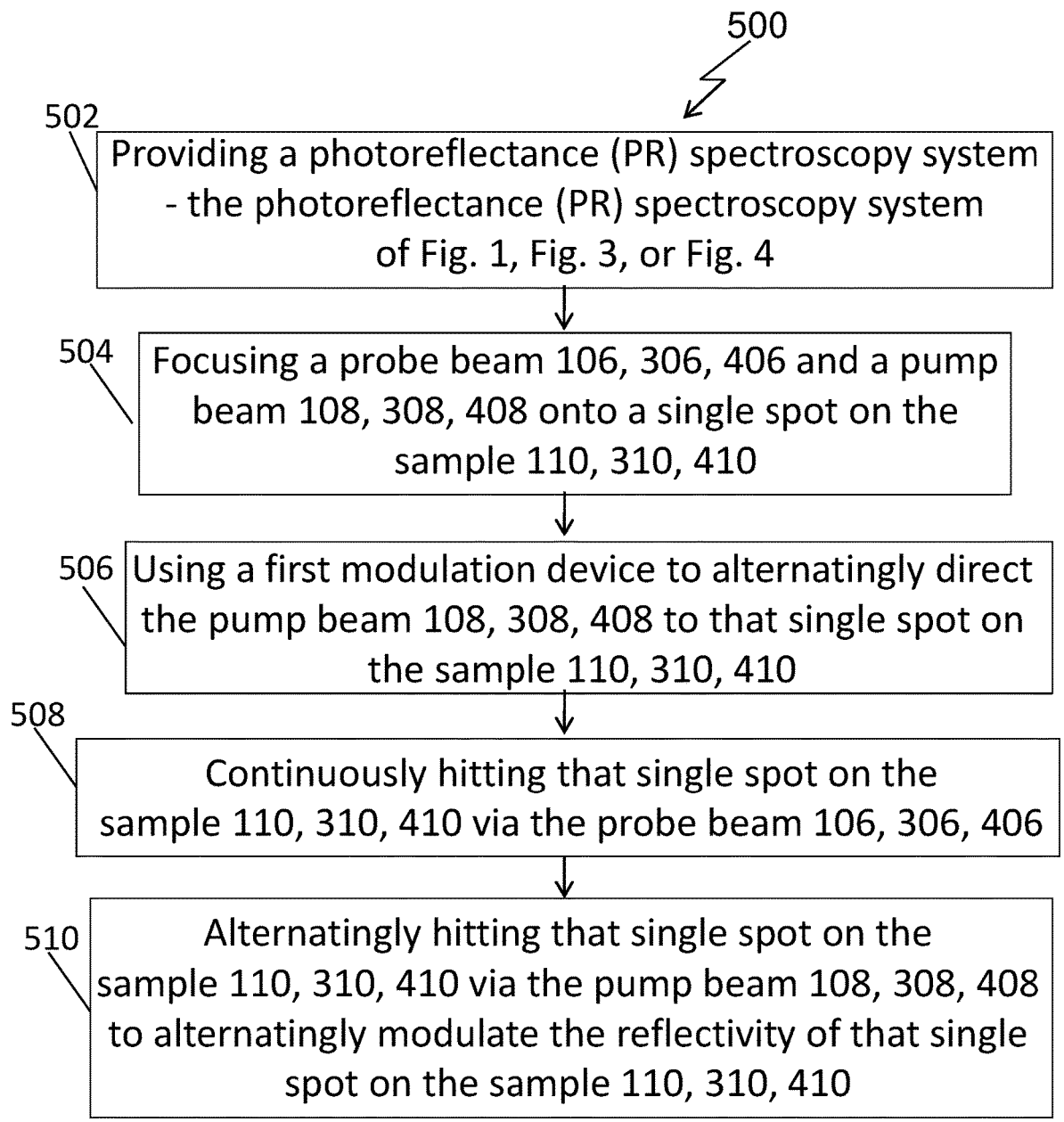
FIG. 5 illustrates a method 500 for measuring the light-induced change in optical properties of a sample in accordance with some embodiments of the present invention.

FIG. 5 illustrates a method 500 for measuring the light-induced change in optical properties of a sample in accordance with some embodiments of the present invention.

The method 500 comprising the following steps:

Step 502: providing the above-described photoreflectance (PR) spectroscopy system—the photoreflectance (PR) spectroscopy system of FIG. 1, FIG. 3, or FIG. 4;

Step 504: focusing a probe beam 106, 306, 406 and a pump beam 108, 308, 408 onto a single spot on the sample 110, 310, 410;

Step 506: using a first modulation device to alternatingly direct the pump beam 108, 308, 408 to that single spot on the sample 110, 310, 410;

Step 508: continuously hitting that single spot on the sample 110, 310, 410 via the probe beam 106, 306, 406;

Step 510: alternatingly hitting that single spot on the sample 110, 310, 410 via the pump beam 108, 308, 408 to alternatingly modulate the reflectivity of that single spot on the sample 110, 310, 410 so that when the pump beam 108, 308, 408 reaches the sample 110, 310, 410, the light beam 107, 307, 407 reflecting off the sample 110, 310, 410 is a "pump-on" beam, and when the pump beam 108, 308, 408 is shuttered out, the light beam 107, 307, 407 reflecting off the sample 110, 310, 410 is a "pump-off" beam.

Step 512: using a second modulation device in the collection channel to direct a "pump on" light beam and a "pump off" light beam to a single spectrometer 116, 31 when using either the system of FIG. 1 of the system of FIG. 3. In the single spectrometer, projecting the "pump on" light beam to at least one row on a CCD and the "pump off" light beam to another row(s) on the CCD.

Alternatively, when using the system of FIG. 4, directing a "pump on" light beam to one spectrometer 426B and a "pump off" light beam to another spectrometer 426A.

Step 514: converting the "pump on" light beam and the "pump off" light beam into a "pump on" signal and a "pump off signal and transferring the "pump on" signal and the "pump off signal to a computer; and Step 516: subtracting the "pump on" signals, e.g., the spectrum (R) produced via the "pump on" output beam from the "pump off" signals, e.g., the spectrum (R+ΔR) produced via the "pump off" output beam to get the PR signal ΔR.

The invention claimed is:

1. A photoreflectance (PR) spectroscopy apparatus for accumulating separately a "pump on" light beam and a "pump off" light beam reflecting off a sample comprising:

(a) a probe source for producing a probe beam, said probe beam is used for measuring spectral reflectivity of a sample;

(b) a pump source for producing a pump beam;

(c) at least one spectrometer;

(d) a first modulation device to allow said pump beam to alternatingly modulate the spectral reflectivity of the sample, so that, a light beam reflecting from said sample is alternatively a "pump on" light beam and a "pump off" light beam; and (e) a second modulation device in a path of said light beam reflecting off the sample to alternatingly direct said "pump on" light beam and said "pump off" light beam to the at least one spectrometer;

wherein in case said photoreflectance (PR) spectroscopy apparatus comprises a single spectrometer, said single spectrometer projects said "pump on" light beam to at least one row on a CCD and said "pump off" light beam to another row(s) on the CCD, so that "pump on" signals and "pump off" signals are accumulated separately, and wherein in case said photoreflectance (PR) spectroscopy apparatus comprises multiple spectrometers, said second modulation device directs said "pump on" light beam to one spectrometer and said "pump off" light beam to another spectrometer so that "pump on" signals and "pump off" signals are accumulated separately;

wherein said first modulation device and/or said second modulation device are selected from a mechanical chopper wheel, electro-optic modulator or acousto-optic modulator;

wherein each of the first modulation device and the second modulation device is either a synchronized chopper wheel controller or a deflection device;

wherein in case said second modulation device is a synchronized chopper wheel controller, the photoreflectance (PR) spectroscopy apparatus further comprises a beam splitter for splitting the light beam reflecting from the sample into a "pump on light beam and a "pump off" light beam.

2. The photoreflectance (PR) spectroscopy apparatus of claim 1, wherein the pump beam is attenuated via electronic, optical or electro-optical means.

3. The photoreflectance (PR) spectroscopy apparatus of claim 1, wherein said first modulation device is either in a path of the pump beam or directly modulating said pump source power.

4. The photoreflectance (PR) spectroscopy apparatus of claim 1, wherein the CCD of said single spectrometer is either a multiple array sensor or multi separate linear arrays sensor.

5. The photoreflectance (PR) spectroscopy apparatus of claim 4, wherein said multiple array sensor is a 2D sensor array.

6. The photoreflectance (PR) spectroscopy apparatus of claim 4, wherein a frame rate of said CCD is constrained by a full-well capacity of said multiple array sensor or said multi separate linear arrays sensor.

7. A photoreflectance (PR) spectroscopy system for measuring and calculating light-induced change in optical properties of a sample comprising the photoreflectance (PR) spectroscopy apparatus of claim 1 and a computer, wherein the photoreflectance (PR) spectroscopy apparatus converting said "pump on" light beam and said "pump off" light beam to a "pump on" signal and a "pump off" signal and transferring said "pump on" signal and said "pump off" signal to a computer, and said computer subtract the "pump on" signal corresponding to a spectrum (R) from the "pump off" signal corresponding spectrum (R+AR) to get a PR signal AR.

8. A photoreflectance (PR) spectroscopy method for measuring and calculating light-induced change in optical properties of a sample comprising:
(i) providing the photoreflectance (PR) spectroscopy system of claim 7;
(j) focusing a probe beam and a pump beam onto a single spot on a sample;
(k) using a first modulation device to alienatingly direct the pump beam to said single spot on the sample;
(l) continuously hitting said single spot via the probe beam;
(m) alternatingly hitting said single spot by the pump beam to alternatingly modulate the reflectivity of said single spot on the sample, so that, a light beam reflecting off said sample is comprised of a "pump on" light beam and a "pump off" light beam;
(n) using a second modulation device to direct the "pump on" light beam and the "pump off" light beam either to a single spectrometer or to multiple spectrometers;
(o) converting said "pump on" light beam and said "pump off" light beam into a "pump on" signal and a "pump off signal and transferring said "pump on" signal and said "pump off signal to a computer; and
(p) subtracting the "pump on" signal corresponding to a spectrum (R) from the "pump off" signal corresponding spectrum (R+AR) to get a PR signal AR.

9. The photoreflectance (PR) spectroscopy method of claim 8, wherein in case of a single spectrometer, projecting the "pump on" light beam to at least one row on a CCD and the "pump off" light beam to another row(s) on said CCD.

10. The photoreflectance (PR) spectroscopy method of claim 8, wherein in case of multiple spectrometers, projecting the "pump on" light beam to one spectrometer and the "pump off" light beam to another spectrometer.

\* \* \* \* \*